US006810424B2

(12) United States Patent
Takla

(10) Patent No.: US 6,810,424 B2
(45) Date of Patent: Oct. 26, 2004

(54) LINK LAYER DEVICE AND METHOD OF TRANSLATING PACKETS BETWEEN TRANSPORT PROTOCOLS

(75) Inventor: Mourad Takla, Cairo (EG)

(73) Assignee: Agere Systems Inc., Allentown, PA (US)

(*) Notice: Subject to any disclaimer, the term of this patent is extended or adjusted under 35 U.S.C. 154(b) by 779 days.

(21) Appl. No.: 09/791,139

(22) Filed: Feb. 22, 2001

(65) Prior Publication Data

US 2002/0169894 A1 Nov. 14, 2002

(51) Int. Cl.[7] .............................................. G06F 15/16

(52) U.S. Cl. ........................ 709/230; 709/246; 370/466

(58) Field of Search ................................ 709/230, 246; 370/227, 231, 232, 235, 252, 253, 466, 467

(56) References Cited

U.S. PATENT DOCUMENTS

| | | | | |
|---|---|---|---|---|
| 5,414,707 A | * | 5/1995 | Johnston et al. | 370/395.6 |
| 5,535,242 A | * | 7/1996 | Brigida et al. | 375/222 |
| 6,118,834 A | * | 9/2000 | Rasanen | 375/372 |
| 6,498,794 B1 | * | 12/2002 | Tsukamoto et al. | 370/395.1 |
| 6,574,230 B1 | * | 6/2003 | Almulhem et al. | 370/412 |

OTHER PUBLICATIONS

David King; Utopia Level 4; AF–PHY–0144.001; ATM Forum Technical Committee; Mar. 2000.

PMC–Sierra, Inc.; POS–PHY™ Level 4—A Saturn Packet and Cell Interface Specification for OC–192 SONET/SDH and 10 Gb/s Ethernet Applications; PMC–991635, Issue 2; Dec. 1999; Burnaby, Canada.

David King; Utopia Level 4 Baseline Text; BTD–PHY–UL4–01.05; ATM Forum Technical Committee; Sep. 1999; Bangkok, Thailand.

* cited by examiner

Primary Examiner—Mehmet B. Geckil

(57) ABSTRACT

For use with a packet transport network having first and second packet networks employing first and second transport protocols, respectively, a link layer device, method of translating packets between transport protocols and a packet transport system employing the device and method. In one embodiment, the link layer device includes a first protocol subsystem that receives and transmits packets in the first transport protocol over the first packet network and a physical layer device subsystem that translates the packets between the first and second transport protocols and communicates with the physical layer device employing flow control. The second transport protocol includes a packet control status with a channel number indicator that accommodates a channel number greater than 256. The link layer device further includes a channel memory subsystem that buffers the packets in a channel storage area on a per channel basis for transmission by the link layer device.

23 Claims, 3 Drawing Sheets

| Name | RCT RL | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|
| ADR | 1 | PKTYPE | | PKSTAT | | ECR_ON | BRST_SIZE | | RESERVE | | | | CH_NUMB[15:0] | | | | | | | | | | | | | | | | | | | OPT_ERD |
| FLC | 1 | PKTYPE | | STATYPE | | ECR_ON | | STATSZ | | CH_STAT | | | | CH_NUMB[15:0] | | | | | | | | | | | | | | | | | | OPT_ERD |
| FSTAT | 1 | PKTYPE | | STATUS_WORD | | | | | | | | | | | | | | | | | | | | | | | | | | | | |
| IDLE | 1 | PKTYPE | | x | x | x | x | x | x | x | x | x | x | x | x | x | x | x | x | x | x | x | x | x | x | x | x | x | x | x | x |
| Data | 0 | Data Word | | | | | | | | | | | | | | | | | | | | | | | | | | | | | | |

FIGURE 3

LINK LAYER DEVICE AND METHOD OF TRANSLATING PACKETS BETWEEN TRANSPORT PROTOCOLS

TECHNICAL FIELD OF THE INVENTION

The present invention is directed, in general, to computer networks and, more specifically, to a link layer device, method of translating packets between transport protocols and a packet transport system employing the device and method.

BACKGROUND OF THE INVENTION

Packet transport systems, such as Asynchronous Transfer Mode (ATM) systems, employ a technique of disassembling information at a sending end of a communications network for insertion into separate packets of data and reassembling the same information from the data packets at a receiving end of the communications network. Communications networks employing this technique are especially advantageous in common carrier or time-shared switching networks, since a communication path or circuit for packet transmission associated with a user's message is only employed while each packet is being forwarded through the communications network. The communication path is, therefore, available to other users or for other communication traffic during intervening periods.

The packet transport systems are capable of providing integrated information transport services for a wide range of applications (e.g., interactive data, bulk data, signaling, packetized voice, image). Instead of designing specialized networks optimized for specific applications, many services can be simultaneously supported over the same path to the switching network. User information of varying types is converted into packets, and the switching network transports the packets between users. Instead of being tied to fixed rate connections, the switching network adapts the connection rates to the particular needs of the end users. Furthermore, it is possible to create a uniform user-network interface that is applicable to a broad range of services.

The presently available packet transport systems, however, can only handle a limited number of channels associated with the switching network. The systems are restricted by the transmission protocol and the ability of the packet transport systems to accommodate a large number of channels without dropping a large number of packets.

Accordingly, what is needed in the art is a system for transporting packets over a packet transport network that may accommodate a large number of channels and overcomes the deficiencies of the prior art.

SUMMARY OF THE INVENTION

To address the above-discussed deficiencies of the prior art, the present invention provides, for use with a packet transport network having first and second packet networks employing first and second transport protocols, respectively, a link layer device, method of translating packets between transport protocols and a packet transport system employing the device and method. In one embodiment, the link layer device includes a first protocol subsystem that receives and transmits packets in the first transport protocol over the first packet network. The link layer device further includes a physical layer device subsystem coupled to a physical layer device associated with the link layer device. The physical layer device subsystem translates the packets between the first and second transport protocols and communicates with the physical layer device employing flow control. The link layer device still further includes a channel memory subsystem, associated with the first protocol subsystem and the physical layer device subsystem, that buffers the packets in a channel storage area on a per channel basis for transmission by the link layer device over one of the first and second packet networks.

The second protocol includes a packet control status with a channel number indicator that accommodates a channel number greater than 256. The packet control status allows the link layer device to manage communications with the second packet network via the physical layer device. The channel number indicator indicates which channel connected to the physical layer device the packet is associated with. In a related embodiment, the channel number indicator is of a type selected from the group consisting of: (1) a 16-bit indicator, (2) a 32-bit indicator and (3) a 64-bit indicator. The maximum number that can be represented by the bit size of the channel number indicator specifies the number of possible channels that can be managed by the link layer device. For example, a 16-bit indicator can represent 65,536 channels. Thus, a link layer device that can manage a large number of channels reduces the number of link layer devices employed for large channel applications.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a block diagram of an embodiment of a packet control status constructed in accordance with the principles of the present invention.

DETAILED DESCRIPTION

Figure 1:
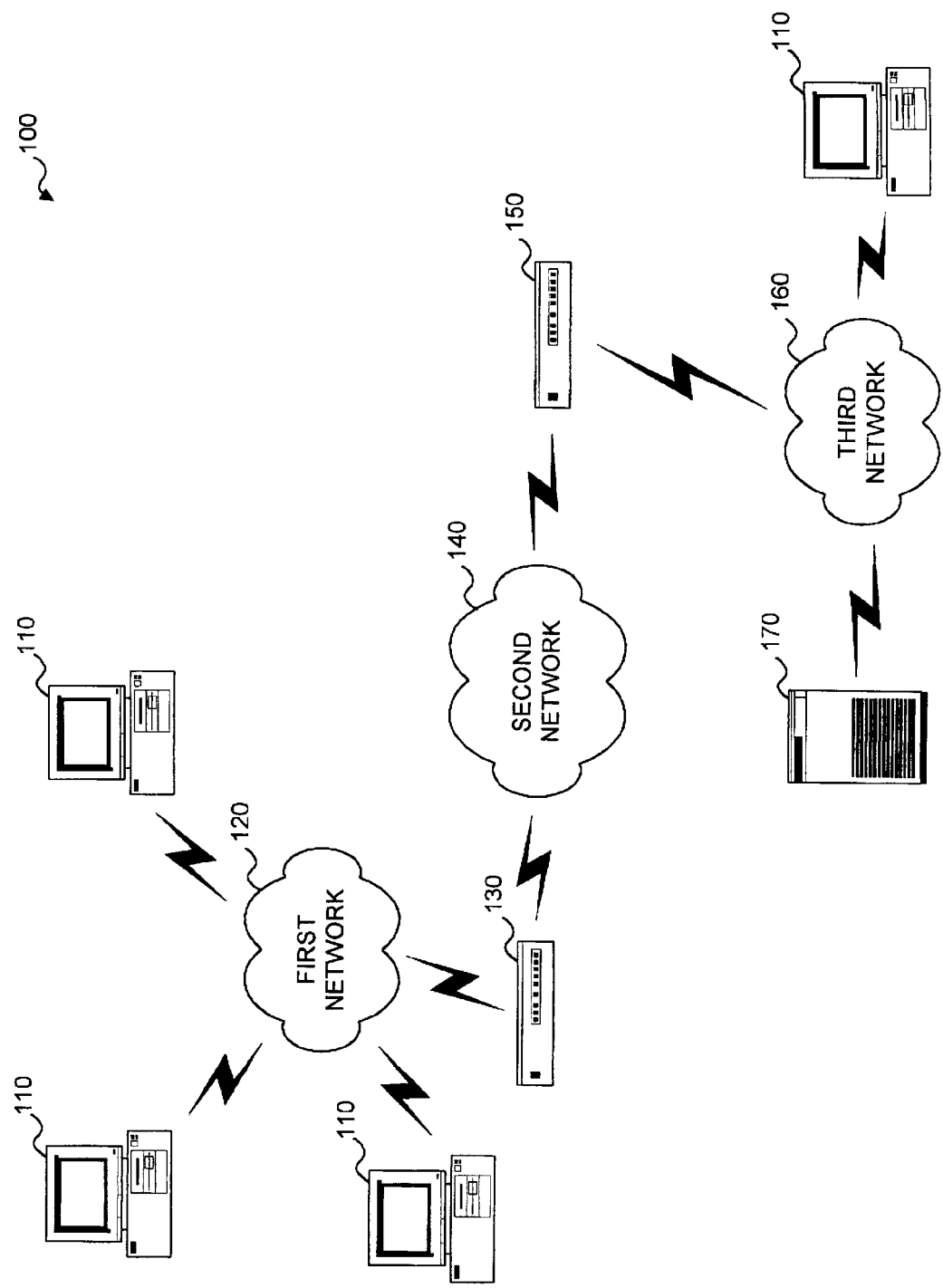
FIG. 1 illustrates a system level diagram of an embodiment of a packet transport network that provides an environment for the present invention.

Referring initially to FIG. 1, illustrated is a system level diagram of an embodiment of a packet transport network 100 that provides an environment for the present invention. The packet transport network 100 is arranged for transporting packets of data from a first network 120 through a second network 140 (e.g., a packet switching network) to a third network 160. For the purposes of the present invention, "packets of data" includes network packets containing information for interactive data, bulk data, signaling, packetized voice and images. The first network 120 may be a Local Area Networks ("LANs"), a Wide Area Networks ("WANs") or other types of networks and may use a variety of transport protocols. For example, if the first network 120 employs Ethernet technology, then a transport protocol employable therewith is a Carrier Sense Multiple Access with Collision Detection ("CSMA/CD") protocol.

A plurality of terminal equipment (generally designated 110) is coupled to the first network 120. The terminal equipment 110 may be conventional computer systems, equipment for providing packetized voice, or other types of systems for distributing data over a computer network. A first bridge 130 is coupled to the first network 120 and the second network 140, such as an Asynchronous Transfer Mode ("ATM") packet switched network or an IP based packet network. The first bridge 130 translates data packets between the transport protocol used in the first network 120 and the transport protocol used in the second network 140. The first bridge 130 includes a packet transport system including a link layer device and a physical layer device, which is explained in more detail below with respect to FIG. 2.

A second bridge 150, similar to the first bridge 130, is coupled to the second network 140 and the third network 160. The second bridge 150 translates data packets between the transport protocol used in the second network 140 and the transport protocol used in the third network 160. The third network 160 may be a LAN, a WAN or other types of computer networks. The third network 160 is also coupled to terminal equipment 110 or a conventional computer server 170. Of course, the present invention is not limited to the types of devices illustrated and described above. Other embodiments of the present invention may have any number of devices connected to the networks and any number of networks.

In the illustrated embodiment, one of the terminal equipment 110, coupled to the first network 120, may advantageously establish a connection with the computer server 170 coupled to the third network 160. The first bridge 130 translates and transports the data packets sent by the terminal equipment 110 to the second network 140. The second network 140 advantageously allows the use of efficient transmission media, such inverse multiplexing over multiple T1 lines. The second bridge 150 translates and transports the data packets sent from the first bridge 130 to the third network 160. The computer server 170 then receives the data packets. This process is reversed for sending packets from the computer server 170 to the terminal equipment 110. Thus, through the use of a packet network, such as an ATM switched network, different networks located at a distance from each other can be connected in an efficient manner.

Figure 2:
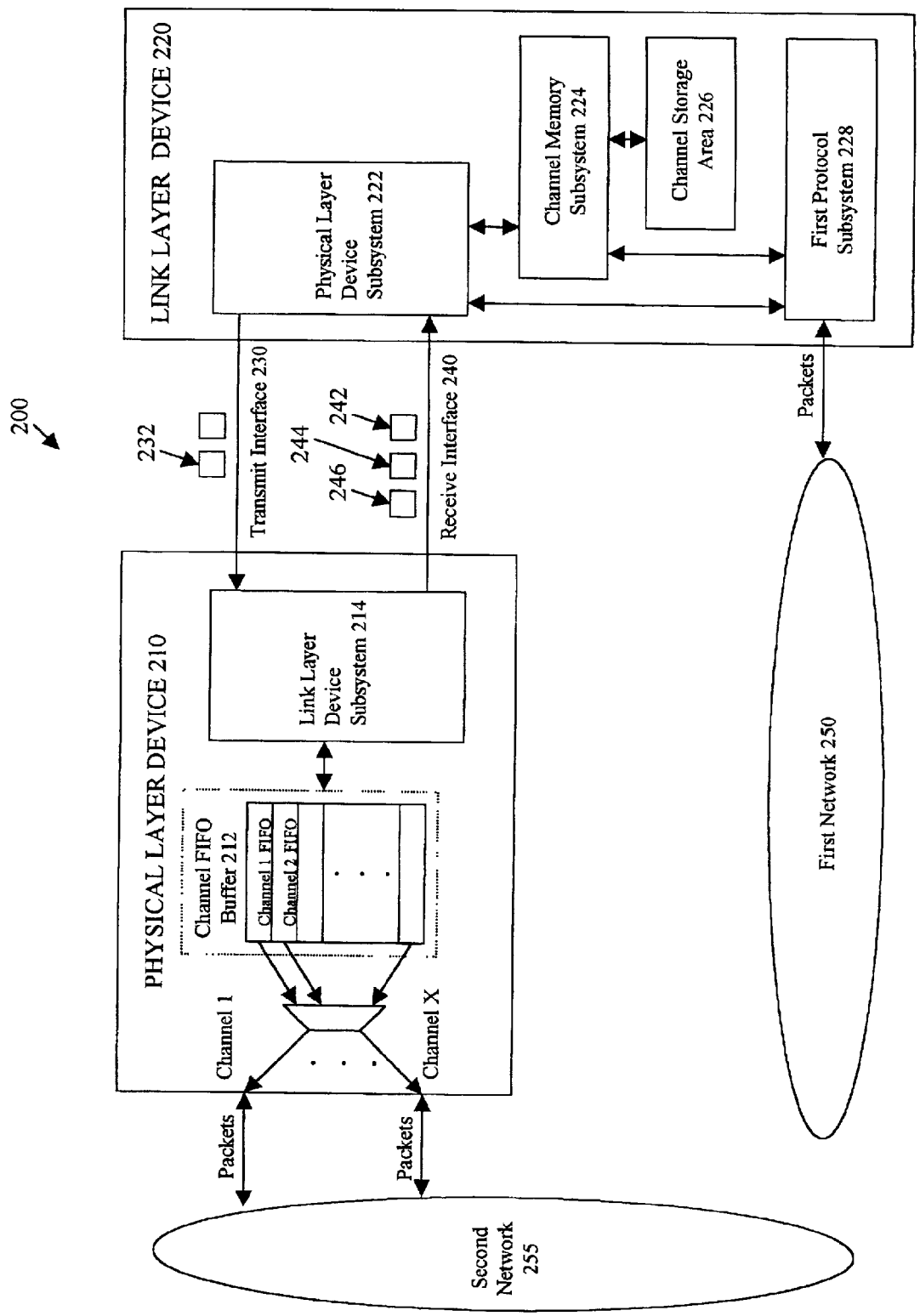
FIG. 2 illustrates a block diagram of an embodiment of a packet transport system constructed in accordance with the principles of the present invention.

Turning now to FIG. 2, illustrated is a block diagram of an embodiment of a packet transport system 200 constructed in accordance with the principles of the present invention. The packet transport system 200 includes a physical layer device 210 and a link layer device 220. The link layer device 220 includes a physical layer device subsystem 222, a channel memory subsystem 224 and a first protocol subsystem 228. The first protocol subsystem 228 is coupled to a first network 250. The first network 250 may be a LAN, a WAN or another type of computer network. The first protocol subsystem 228 receives and transmits packets in a first transport protocol over the first network 250. In another embodiment, the first protocol subsystem 228 may receive and transmit packets over a bus. One skilled in the pertinent art is familiar with packets transmitted over a network and hardware buses.

The first protocol subsystem 228 may be embodied in software, hardware or a combination thereof. The first protocol subsystem 228 communicates with the physical layer device subsystem 222 and the channel memory subsystem 224 to cause the packets received from the first network 250 to be transmitted to the physical layer device 210. The first protocol subsystem 228 also transmits packets to the first network 250 that were received from and processed by the physical layer device subsystem 222.

The channel memory subsystem 224 buffers packets for transmission by the first protocol subsystem 228 and the physical layer device subsystem 222. The channel memory subsystem 224 is also coupled to a channel storage area 226 and may be embodied in software, hardware or a combination thereof. The channel storage area 226 is conventional memory and is configured to maintain a buffer for each channel associated with the packet transport system 200.

The physical layer device subsystem 222 is coupleable to the physical layer device 210 and may be embodied in software, hardware or a combination thereof. The physical layer device subsystem 222 translates packets from a first transport protocol associated with the first network 250 to a second transport protocol associated with a second network 255 (e.g., a packet switched network) coupled to the physical layer device 210. The physical layer device subsystem 222 transmits the translated packets to the physical layer device 210 via a transmit interface 230. In another embodiment, the physical layer device subsystem 222 may be coupled to multiple physical layer devices 210 and the transmit interface 230 may be a single communication interface, multiple communication interfaces or a bus.

The physical layer device subsystem 222 also receives packets from the physical layer device 210 via a receive interface 240. The physical layer device subsystem 222 translates the packets, sent from the physical layer device 210, from the second transport protocol to the first transport protocol. The physical layer device subsystem 222 then sends the packets to the first protocol subsystem 228 for transmission to the first network 250. In another embodiment of the present invention, the receive interface 240 coupled to the physical layer device subsystem 222 may be coupled to multiple physical layer devices 210 and may be a single communication interface, multiple communication interfaces or a bus.

In the illustrated embodiment, the physical layer device subsystem 222 also employs flow control when communicating with the physical layer device 210. The flow control may be in-band or out-of-band flow control. One skilled in the pertinent art is familiar with in-band and out-of-band flow control.

The physical layer device 210 is also coupled to the second network 255 and includes a channel FIFO buffer 212 and a link layer device subsystem 214. The second network 255 may be any type of network for packet switching on different transmission media. For example, the second network 255 may be an ATM network using multiple T1 lines. The physical layer device 210 uses one or more channels to send and receive packets over the second network 255. Each of the channels has an associated FIFO buffer within the channel FIFO buffer 212 that buffers packets to and from the second network 255.

The link layer device subsystem 214 is also coupled to the channel FIFO buffer 212 and may be embodied in software, hardware or a combination thereof. The link layer device subsystem 214 communicates with the physical layer device subsystem 222 via the transmit interface 230 and the receive interface 240. In the illustrated embodiment, the link layer device subsystem 214 also employs flow control. The flow control, in one embodiment, may be in-band or out-of-band flow control.

In one embodiment, the packet transport system 200 also employs packet control status in the communications between the physical layer device subsystem 222 and the link layer device subsystem 214. The packet control status contains information concerning the status of channels, the status of channel buffers in the channel FIFO buffer 212, the status of the link layer device 220, the status of buffers within the link layer device 220 and other related information (see FIG. 3 and the related discussion for an embodiment of a packet control status).

To transport packets from the first network 250 to the second network 255, the first protocol subsystem 228 receives the packets from the network 255. The first protocol subsystem 228 sends the received packets to the physical layer device subsystem 222. If the channel associated with the packet is unable to receive the packet or the physical layer device subsystem 222 is unable to process the packet at that time, the first protocol subsystem 228 sends the packet to the channel memory subsystem 224 for storage in the channel storage area 226 on a per channel basis.

The physical layer device subsystem 222 receives the packet from the first protocol subsystem 228 or retrieves a packet associated with a channel from the channel memory subsystem 224. The physical layer device subsystem 222 then translates the packet from the first transport protocol to the second transport protocol. Next, the physical layer device subsystem 222 transmits the translated packet via the transmit interface 230 to the physical layer device 210.

In the illustrated embodiment, the physical layer device subsystem 222 is configured to act as a master device when transmitting packets to the physical layer device 210. As a master device, the physical layer device subsystem 222 controls when and how much data will be transmitted to the physical layer device 210. In one embodiment, the physical layer device subsystem 222 uses a packet control status 232 having a channel number indicator to control the transmission. Advantageously, the channel number indicator can accommodate a channel number greater than 256. In one embodiment, the channel indicator may consist of a 16-bit indicator, a 32-bit indicator or a 64-bit indicator. Using a packet control status having a channel number indicator that is at least 16-bits advantageously allows the link layer device 220 to process a large number of channels connected to one or more physical layer devices.

The link layer device subsystem 214 is configured to be a slave device for receiving packets from the link layer device 220. A slave device is dependent upon the master device to control when and how much data the slave device will receive. Once the link layer device subsystem 214 receives the packet from the link layer device 220, the link layer device subsystem 214 employs the channel FIFO buffer 212 to transmit the packets to the second network 255.

When the link layer device subsystem 214 is transmitting packets in the second transport protocol to the link layer device 220, the link layer device subsystem 214 is configured to be a master device. The link layer device subsystem 214 controls when and how much data will be sent to the link layer device 220. In one embodiment, the link layer device subsystem 214 employs packet control status 242, 246 to control packet transmission. As illustrated, the link layer device subsystem 214 sends, via the receive interface 240, a packet control status 242 followed by a data packet 244 and another packet control status 246. Of course, however, the present invention is not limited to the number of or the order of the packet control status and the data packets as illustrated in FIG. 2. In other embodiments of the present invention, any number of packet control status and data packets may be used and may occur in any order.

The physical layer device subsystem 222 translates the received packets from the second transport protocol to the first transport protocol. Then, the physical layer device 210 employs the channel memory subsystem 224 to buffer packets to the first protocol subsystem 228 on a per channel basis if needed. The first protocol subsystem 228 then transmits the packet to the first network 250.

One skilled in the pertinent art should know that the present invention is not limited to the order of processing or the type of processing described above. Other embodiments of the present invention may perform additional or fewer types of processing than described above.

Turning now to FIG. 3, illustrated is a block diagram of an embodiment of packet control status constructed in accordance with the principles of the present invention. The packet control status advantageously allows a link layer device and one or more physical layer devices to handle a large number of channels connected to a packet network. As illustrated, the packet control status includes a channel number indicator $CH_{13}$ NUMB having a field size of 16-bits. This allows the system to handle or process up to 64 k channels. Other embodiments of the present invention may use a channel number indicator having any field size than accommodates a channel number greater than 256. Tables 3.1 describes the contents of the packet control status of FIG. 3.

TABLE 3.1

| Name | Word | Size | Pos | Field Description |
|---|---|---|---|---|
| PKTYPE | ADR | 2 | 31:30 | Packet Type: This describes the type of the control word.<br>00: ADR: This word is an address word and the next word is a data word.<br>01: FLC: This is a FIFO level control word. Indicates the status of the FIFO of the channel given by CH_NUMB. Type of Next word is decided by STYPE.<br>10: FSTAT: FIFO Status Word. This word provides the FIFO status for multiple channels.<br>11: IDLE: Bus is IDLE |

TABLE 3.1-continued

| Name | Word | Size | Pos | Field Description |
|---|---|---|---|---|
| PKSTAT | ADR | 3 | 29:27 | Packet Status: This indicates the status of a cell/packet being transmitted in the following data word.<br>000    Normal Data. Body of packet<br>001    The first byte of the following word is the beginning of the packet.<br>010    The end of the packet is included in the next burst.<br>011    The next burst includes a full packet.<br>100    The current packet for this channel is Aborted.<br>101    Packet has terminated in Error (Bad CRC)<br>11x    Reserved |
| ECR_ON | ADR | 1 | 26 | Error Detection On: This bit indicated whether the last field is used for Error detection of the control word or not.<br>0    Error detection is not used and the last field is to be ignored.<br>1    Error detection is Set and the last field is to be used to validate the correctness of the current control word. |
| BRST_SIZE | ADR | 2 | 25:20 | Burst Size: Indicates the number of invalid bytes in the last data word of this packet. Valid bytes are aligned to the LSB of the Bus. |
| CH_NUMB | ADR | 16 | 19:04 | Channel Number: Indicates the channel number for which this word and the next data words belong. |
| OPT_ERD | ADR | 4 | 03:00 | Optional Error Detection: This is an optional error detection mechanism. Either CRC-4 or a mechanism similar to that proposed by POS-PHY-4 can be adopted. Bit ECR_ON indicates whether the value of this field is valid or not. If not used, it should be set to ZEROs. |
| STATYPE | FLC | 3 | 29:27 | Status Type: The type of status word being carried by the current and/or next status word.<br>0xx    Receive Direction Status<br>1xx    Transmit Direction Status<br>x00    Event Driven Status for the channel indicated by CH_NUMB. Only CHN_STAT is valid.<br>x01    Periodic Status: Indicated that the current status word is a periodic status word. The first channel to be reported is the channel indicated by the CH_NUMB. Following FIFO Status are in the following FSTAT word.<br>x1x    Reserved |
| STATSZ | FLC | 3 | 25:23 | FIFO Status Size: The number of FSTAT word following the current FLC word. Valid only with STATYPE = x01. Otherwise set to all ZEROs. |
| CH_STAT | FLC | 3 | 22:20 | Channel Status: Indicates the Status of the current channel.<br>000    Normal FIFO level<br>010    Almost Empty FIFO level. FIFO has dropped below a user programmable level and may run dry.<br>011    Starving FIFO level. FIFO will run dry if data is not delivered immediately.<br>100    Almost Full FIFO level. Data has exceeded a certain threshold.<br>101    FIFO is full. Cannot accept more data.<br>110    ERROR. FIFO has run empty and current packet has been aborted.<br>111    FIFO has run over and last data received has been lost. |
| STATUS_WORD | FSTAT | 30 | 29:00 | FIFO Status Word: Indicates the FIFO status of several channels each is represented as the CH_STAT. This status word is valid only after a periodic status indication. |
| IDLE | IDLE | 30 | 29:00 | IDLE: Used when not sending a particular channel data. |

As illustrated in FIG. 3 and Table 3.1, the present invention advantageously provides additional packet status (PKSTAT) beyond what the existing systems provide. For example, the existing system provide a start of packet type and an end of packet type. The present invention, however, also provides an aborted packet type and a bad CRC type. These additional packet status types provide more information for more efficient control of the system and statistical analysis. For background information concerning packet transmissions, see UTOPIA Level 4 Baseline Text BTD-PHY-UL4-01.05, ATM Forum Technical Committee, September 1999 and POS-PHY Level 4, a Saturn Packet and cell and Cell Interface Specification for OC-192 SONET/SDH and 10 Gb/s Ethernet Applications, PMC-Sierra, Inc., Issue 2, December 1999 and both are herein incorporated by reference.

The packet control status also includes an error detection on indicator (ECR_ON) and an optional error detection value (OPT_ERD). These fields allow for error detection for serial transmission of data and the use of a single line for transmission instead of 32 lines. These fields also allow for information to be exchanged that is similar to the ATM cells.

The error detection on indicator, when set, indicates that the value in the optional error detection value is valid. In one embodiment, the optional error detection value is generated by CRC-4 or POS-PHY-4 error detection mechanisms. One skilled in the pertinent art is familiar with CRC-4 and POS-PHY-4 error detection mechanisms. Of course, however, the present invention is not limited to these error detection mechanisms and other types of error detection mechanisms are within the broad scope of the present invention.

Another feature of the packet control status is the FIFO level control status size (STATSZ). The FIFO level control status size indicates a number of status words that follow the packet control status. This allows the present invention, in one embodiment, to transmit multiple status words to convey the status of multiple channels.

Those skilled in the art understand that the previously described embodiment of the packet transport system is submitted for illustrative purposes only and other embodiments are well within the broad scope of the present invention. Although the present invention has been described in detail, those skilled in the art should understand that they can make various changes, substitutions and alterations herein without departing from the spirit and scope of the invention in its broadest form.

What is claimed is:

1. For use with a packet transport network having first and second packet networks employing first and second transport protocols, respectively, a link layer device, comprising:

a first protocol subsystem configured to receive and transmit packets in said first transport protocol over said first packet network;

a physical layer device subsystem coupleable to a physical layer device associated with said link layer device, said physical layer device subsystem configured to translate said packets between said first and second transport protocols and communicate with said physical layer device employing flow control, said second transport protocol includes a packet control status with a channel number indicator that accommodates a channel number greater than 256; and a channel memory subsystem, associated with said first protocol subsystem and said physical layer device subsystem, configured to buffer said packets in a channel storage area on a per channel basis for transmission by said link layer device over one of said first and second packet networks.

2. The link layer device as recited in claim 1 wherein said channel number indicator is of a type selected from the group consisting of:

a 16-bit indicator, a 32-bit indicator, and a 64-bit indicator.

3. The link layer device as recited in claim 1 wherein said packet control status further includes a packet type selected from the group consisting of:

an address status, a FIFO level control status, a FIFO status, and an Idle status.

4. The link layer device as recited in claim 3 wherein said packet control status further includes an error detection on indicator and an optional error detection value when said packet type is said address status or said FIFO level control status, said optional error detection value is valid when said error detection on indicator is set.

5. The link layer device as recited in claim 3 wherein said packet control status further includes a packet status when said packet type is said address status, said packet status having a start of packet type, a end of packet type, an aborted packet type and a bad CRC type.

6. The link layer device as recited in claim 3 wherein said packet control status further includes a FIFO level control status size when said packet type is said FIFO level control status, said FIFO level control status size indicates a number of status words that follow said packet control status that conveys the status of multiple channels.

7. The link layer device as recited in claim 1 wherein said physical layer device subsystem is further configured to be a master device when transmitting said packets to said physical layer device and a slave device when receiving said packets from said physical layer device.

8. The link layer device as recited in claim 1 wherein said physical layer device includes:

a channel first-in, first-out (FIFO) buffer for each channel connected to said second packet network configured to buffer said packets to and from said second packet network; and a link layer device subsystem coupleable to said link layer device and configured to communicate with said link layer device employing flow control.

9. For use with a packet transport network having first and second packet networks employing first and second transport protocols, respectively, a method of translating packets between transport protocols, comprising:

receiving and transmitting packets in said first transport protocol over said first packet network;

translating said packets between said first and second transport protocols and communicating with a physical layer device employing flow control, said second transport protocol includes a packet control status with a channel number indicator that accommodates a channel number greater than 256; and buffering said packets in a channel storage area on a per channel basis for transmission over one of said first and second packet networks.

10. The method as recited in claim 9 wherein said channel number indicator is of a type selected from the group consisting of:
   a 16-bit indicator,
   a 32-bit indicator, and
   a 64-bit indicator.

11. The method as recited in claim 9 wherein said packet control status further includes a packet type selected from the group consisting of:
   an address status,
   a FIFO level control status,
   a FIFO status, and
   an Idle status.

12. The method as recited in claim 11 wherein said packet control status further includes an error detection on indicator and an optional error detection value when said packet type is said address status or said FIFO level control status, said optional error detection value is valid when said error detection on indicator is set.

13. The method as recited in claim 11 wherein said packet control status further includes a packet status when said packet type is said address status, said packet status having a start of packet type, a end of packet type, an aborted packet type and a bad CRC type.

14. The link layer device as recited in claim 11 wherein said packet control status further includes a FIFO level control status size when said packet type is said FIFO level control status, said FIFO level control status size indicates a number of status words that follow said packet control status that conveys the status of multiple channels.

15. The method as recited in claim 9 wherein said communicating with said physical layer device further includes acting as a master device when transmitting said packets to said physical layer device and acting as a slave device when receiving said packets from said physical layer device.

16. The method as recited in claim 9 wherein said physical layer device includes:
   a channel first-in, first-out (FIFO) buffer for each channel connected to said second packet network that buffers said packets to and from said second packet network; and
   a link layer device subsystem, associated with said FIFO buffer, that receives said translated packets and transmits packets in said second protocol employing flow control.

17. For use with a packet transport network having first and second packet networks employing first and second transport protocols, respectively, a packet transport system, comprising:
   a link layer device coupled to said first packet network, including:
      a first protocol subsystem that receives and transmits packets in said first transport protocol over said first packet network,
      a physical layer device subsystem coupled to a physical layer device associated with said link layer device, said physical layer device subsystem translating said packets between said first and second transport protocols and communicating with said physical layer device employing flow control, said second transport protocol includes a packet control status with a channel number indicator that accommodates a channel number greater than 256, and
      a channel memory subsystem, associated with said first protocol subsystem and said physical layer device subsystem, that buffers said packets in a channel storage area on a per channel basis for transmission by said link layer device over one of said first and second packet networks; and
   a physical layer device, coupled to said second packet network, that receives and transmits packets in said second protocol via said second packet network, including:
      a channel first-in, first-out (FIFO) buffer for each channel connected to said second packet network that buffers said packets to and from said second packet network, and
      a link layer device subsystem, coupled to said link layer device, that communicates with said link layer device employing flow control.

18. The packet transport system as recited in claim 17 wherein said channel number indicator is of a type selected from the group consisting of:
   a 16-bit indicator,
   a 32-bit indicator, and
   a 64-bit indicator.

19. The packet transport system as recited in claim 17 wherein said packet control status further includes a packet type selected from the group consisting of:
   an address status,
   a FIFO level control status,
   a FIFO status, and
   an Idle status.

20. The packet transport system as recited in claim 19 wherein said packet control status further includes an error detection on indicator and an optional error detection value when said packet type is said address status or said FIFO level control status, said optional error detection value is valid when said error detection on indicator is set.

21. The packet transport system as recited in claim 19 wherein said packet control status further includes a packet status when said packet type is said address status, said packet status having a start of packet type, a end of packet type, an aborted packet type and a bad CRC type.

22. The packet transport system as recited in claim 19 wherein said packet control status further includes a FIFO level control status size when said packet type is said FIFO level control status, said FIFO level control status size indicates a number of status words that follow said packet control status that conveys the status of multiple channels.

23. The packet transport system as recited in claim 17 wherein said physical layer device subsystem is a master device when transmitting said packets to said physical layer device and a slave device when receiving said packets from said physical layer device.

* * * * *